UNITED STATES PATENT OFFICE.

JOSEPH VAN RUYMBEKE, OF CHICAGO, ILLINOIS, ASSIGNOR, BY DIRECT AND MESNE ASSIGNMENTS, TO THE NATIONAL CHEMICAL AND FERTILIZER COMPANY, OF SAME PLACE.

OBTAINING CYANIDE AND FERRO-CYANIDE FROM TANK-WATER.

SPECIFICATION forming part of Letters Patent No. 362,236, dated May 3, 1887.

Application filed August 17, 1885. Serial No. 174,588. (No specimens.)

*To all whom it may concern:*

Be it known that I, JOSEPH VAN RUYMBEKE, a citizen of Belgium, residing at Chicago, in the county of Cook and State of Illinois, have invented certain new and useful Improvements in Processes of Producing Ferro-Cyanides and Cyanides, which are fully set forth in the following specification.

Heretofore cyanides have been prepared by melting alkalies and maintaining them in a melted condition at red heat, then adding thereto solid nitrogenous materials by slowly projecting them into this bath of liquid alkalies. The nitrogenous materials, being thus suddenly brought under the influence of a high degree of heat, are very quickly decomposed, and evolve so large a quantity of gas as to repel the alkali, thus preventing its contact with the nitrogen or ammonia liberated. The contact of these gases with the liquid alkalies being essential for the production of cyanogen, the above process tends to prevent such contact, and it necessarily follows that only a very small proportion of the nitrogenous material is transformed into cyanogen, and a large amount of the nitrogen and ammoniacal gases escape. Cyanogen has also been produced from horns, hoofs, blood, leather, &c., moistened with a solution of soluble alkalies or alkaline salts. Care, however, has been exercised to have all the alkalies carbonated before or after their admixture with the nitrogenous substances, so as to avoid caustic alkali in presence of the organic matter during its decomposition. This class of organic substances are all insoluble, or become so as soon as subjected to 150° Fahrenheit, which insoluble condition prevents their intimate contact with the alkali, whereby the efficiency of the alkali is lessened during the destructive distillation.

In my process of producing cyanides I employ a nitrogenous solution known as "tank-water," which has been first prepared from animal substances by the action of steam at a high degree of heat and pressure of about forty pounds, whereby the phosphates and insoluble portions of osseine and adipose have been removed, leaving only soluble nitrogenous substances in solution. To this solution of nitrogenous substance is added a solution of either soda or potash holding finely-divided baryta in suspension; but it is not required that the alkali should be carbonated, there being sufficient carbon in the organic matter. The solution of alkali holding the baryta in suspension is then intimately mixed with the nitrogenous solution, thus obtaining a homogeneous compound, which is evaporated until reduced to about twenty per cent. of moisture, when it is siphoned into a decomposing-retort closed at the top and provided with feeding-aperture. The upper portion of this kiln being comparatively cold, the process of desiccation will be completed before any notable destruction begins. The mass, as it descends in the kiln or retort, is brought up gradually to a red heat; but fusion is prevented by the presence of the baryta and the carbon resulting from the organic matter.

The gases produced by the destructive distillation contain a large proportion of ammonia, carrying at least nine-tenths of all the nitrogen contained in the original organic matter. These gases, instead of being allowed to escape as soon as produced, are forced to pass down and through the porous mixture of red-hot alkali carbon and the cyanides already formed. During this contact of the ammonia with the red-hot alkali, carbon, and cyanides a large proportion of the ammonia is decomposed and transformed into cyanogen by combination with the alkali and carbon. After the organic matter is thoroughly decomposed, and while the residue is all at red heat, but porous on account of the infusible baryta and the large proportion of carbon which remains unattacked, there is forced through the mass a current of air in which the oxygen has been transformed into oxide of carbon by first passing it through a column of coke maintained at red heat. The residue is then washed with water, and the solution thus obtained is afterward crystallized by evaporation, or, preferably, the cyanides are first transformed into ferro-cyanides by the action of soluble salts of iron and the resulting solution of ferro-cyanides made to crystallize by evaporation.

What I claim is—

The described process of making cyanides from tank-waters, which consists in first heating them to a high temperature under pressure, then adding a solution of alkali and evaporating to about twenty per cent. of the moisture, and finally subjecting the residue to destructive distillation at red heat and forcing the ammonia thus generated to pass downward through the porous mixture of red-hot alkali, carbon, and cyanides already formed, substantially as set forth.

JOSEPH VAN RUYMBEKE.

Witnesses:
WM. ZIMMERMAN,
WM. F. JOBBINS.